(12) United States Patent
Himeshima et al.

(10) Patent No.: US 6,596,192 B2
(45) Date of Patent: Jul. 22, 2003

(54) OXYGEN ABSORBENT COMPOSITION ABSORBING WATER VAPOR

(75) Inventors: Tomoharu Himeshima, Tokyo (JP); Nahomi Aoyama, Tokyo (JP); Syoichi Nito, Tokyo (JP); Kazuyuki Tomita, Tokyo (JP); Junko Baba, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/908,539

(22) Filed: Jul. 20, 2001

(65) Prior Publication Data

US 2002/0153512 A1 Oct. 24, 2002

(30) Foreign Application Priority Data

Jul. 24, 2000 (JP) ........................................ 2000-221694

(51) Int. Cl.$^7$ .......................... C09K 15/02; C09K 15/04
(52) U.S. Cl. .................. 252/188.28; 252/194; 252/384; 252/389.1
(58) Field of Search ............................ 252/188.28, 384, 252/389.1, 194

(56) References Cited

U.S. PATENT DOCUMENTS

| 4,908,151 | A | * | 3/1990 | Inoue | .................... 252/188.28 |
| 5,286,407 | A | | 2/1994 | Inoue et al. | |
| 5,378,428 | A | * | 1/1995 | Inoue | ............................ 422/9 |
| 6,045,743 | A | * | 4/2000 | Iwai | ............................ 264/345 |
| 6,057,013 | A | * | 5/2000 | Ching | ........................ 428/35.7 |
| 6,248,258 | B1 | * | 6/2001 | Tomita | .................. 252/188.28 |

FOREIGN PATENT DOCUMENTS

JP        62-60936        12/1987

* cited by examiner

Primary Examiner—Cephia D. Toomer
(74) Attorney, Agent, or Firm—Armstrong, Westerman & Hattori, LLP

(57) ABSTRACT

An oxygen absorbent composition absorbing water vapor mixed a liquid mixed (A) an aliphatic compound(s) with an unsaturated group(s) and (B) a transition metal salt(s) with (C) at least one solid selected from the group consisting of calcium oxide, calcium chloride and magnesium chloride.

4 Claims, No Drawings

OXYGEN ABSORBENT COMPOSITION ABSORBING WATER VAPOR

BACKGROUND OF THE INVENTION

1) Field of the Invention

The present invention relates to an oxygen absorbent composition absorbing water vapor which is used during preservation of metals, metallic parts, electrical and electronic parts, magnetic and optical parts, plastics, glasses, rubbers, adhesive tapes, photographic films, foods, medical drugs, unearthed metals and art objects in a hermetically sealed container in order to maintain the interior of the hermetically sealed container to a dried and oxygen-free state.

2) Prior Art

When metals or dry foods are preserved in a hermetically sealed container, the presence of oxygen and water vapor including moisture and water in a hermetically sealed container deteriorates their qualities during preservation. Hitherto, as methods for preserving these articles in a hermetically sealed container in a dried and oxygen-free state, the following methods have been known.

(a) A method comprising enclosing a drying agent and an article to be preserved in a container with a barrier property against both oxygen and water and replacing air in the container with nitrogen and then hermetically sealing the container.

(b) A method comprising enclosing both a drying agent and an oxygen absorbent together with an article to be preserved in a container having a barrier property against both oxygen and water vapor and then hermetically sealing the container.

However, the above-mentioned (a) method caused problems that the oxygen concentration in the hermetically sealed container was increased due to oxygen permeated the container and invaded into its interior, so that qualities of an article to be preserved were deteriorated.

On the other hand, the above-mentioned (b) method required much labor since it was necessary to enclose in a container two agents of commercial drying agent and commercial oxygen absorbent filled and enclosed into two separate small bags and to seal hermetically the container. Thus, it was desired to assemble the two agents into one agent with both drying function and oxygen absorbing function. For the purpose, it was considered to fill and enclose both a drying agent composition and an oxygen absorbent composition into one same small bag and to provide with both water vapor absorbing function and oxygen absorbing function in one small bag. However, substances absorbing oxygen such as iron and ascorbic acid possess common feature that water is indispensable in order to absorb oxygen. Therefore, when a mixture of a powdery oxygen absorbent composition and a powdery drying agent composition was enclosed in one small bag to make a product as a composition absorbing both oxygen and water vapor, there was a defect that the drying agent composition absorbed water in the oxygen absorbent composition, so that oxygen absorbent function itself was degraded.

Thus, an oxygen absorbent composition requiring no water for absorption of oxygen can be mixed with a drying agent composition. As an oxygen absorbent requiring no water, Japanese Patent Kokai (Laid-open) No. 56-155641 discloses an oxygen absorbent composition in which an unsaturated fatty acid compound(s) of an oxygen absorbent is (are) supported on a porous carrier. In order to provide such oxygen absorbent composition with an ability absorbing water vapor, separate drying agent composition may be mixed, However, in such case, there was a problem that total volume was increased by volume of the separate drying agent composition thus mixed, so that the size of a small bag to be hermetically sealed became large. The smaller total volume of the composition, the more advantageous is the cost in production.

SUMMARY OF THE INVENTION

An object of the present invention is to provide an oxygen absorbent composition absorbing water vapor and absorbing stably and rapidly oxygen in order to absorb and remove both oxygen and water vapor in a hermetically sealed container.

Japanese Patent Kokai (Laid-open) No. 56-155641 exemplifies zeolite, silica gel, alumina and activated carbon as porous carriers (hereinafter, "porous carrier such as zeolite"). The porous carriers such as zeolite are capable of functioning as drying agents and can be used as a carrier of an oxygen absorbent. However, when an unsaturated fatty acid compound(s) of oxygen absorbent was(are) supported on a porous carrier such as zeolite, there were problems that the oxygen absorbing velocity of the composition thus obtained was not only small, but also it depended on water content of a porous carrier such as zeolite and the higher the water content of a porous carrier such as zeolite, the more was required the time (induction period) necessary to start oxygen absorption, so that the oxygen absorbing performance became bad and unstable, e.g., in a low oxygen concentration of about 1%, an oxygen concentration of 0.1% or below could not be reached due to lowering of oxygen absorbing velocity. Further, there was also a problem that when a porous carrier such as zeolite was exposed to the atmosphere, moisture was absorbed in several hours to increase water content, so that it was difficult to preserve heat-dried a porous carrier such as zeolite of low water content in the state of low water content and to produce the composition.

The inventors have found that a composition mixed a liquid absorbing oxygen without requiring water with a specific solid drying agent absorbs water and absorbs also oxygen more rapidly than in case of supporting an oxygen absorbent on a porous carrier such as zeolite and have accomplished the present invention.

That is, the present invention provides an oxygen absorbent composition absorbing water vapor mixed a liquid (hereinafter, "mixed liquid of (A) and (B)) mixed (A) an aliphatic compound(s) with an unsaturated group(s) and (B) a transition metal salt(s) with (C) at least one solid (hereinafter "solid compound of (C)") selected from the group consisting of calcium oxide, calcium chloride and magnesium chloride.

As (A) an aliphatic compound(s) with an unsaturated group(s), aliphatic hydrocarbons with an unsaturated group(s), unsaturated fatty acids or fats and oils containing an unsaturated fatty acid(s) can be used. Further, as (B) a transition metal(s), at least one salt of metal selected from the group consisting of Co, Mn, Fe and Cu can be used.

DETAILED DESCRIPTION OF THE INVENTION

As (A) an aliphatic compound(s) with an unsaturated group(s), (hereinafter, "(A) aliphatic compound with unsaturated group"), aliphatic hydrocarbons with an unsaturated group(s), unsaturated fatty acids or fats and oils containing an unsaturated fatty acid(s) can be used.

Examples of the aliphatic hydrocarbons with an unsaturated group(s) include butadiene oligomers, isoprene oligomers, acetylene oligomers, styrene-butadiene copolymers, acrylonitrile-butadiene copolymers, chloroprene oligomers, unsaturated polyester resins and natural rubbers and a mixture or a copolymer of two species thereof or above. Among them, aliphatic hydrocarbons in which a viscosity of liquid is low are preferable since they are readily mixed.

Examples of the fatty acid compounds and the fats and oils containing an unsaturated fatty acid(s) include unsaturated fatty acids such as oleic acid, linoleic acid, linolenic acid, arachidonic acid, parinaric acid, dimer acid and ricinoleic acid and fats and oils unsaturated fatty acid such as linseed oil containing esters of above-mentioned, soybean oil, tung oil, rice bran oil, sesame oil, cotton seed oil, rapeseed oil and tall oil, esters thereof and metal salts thereof. Further, as the unsaturated fatty acid, fatty acids obtainable from vegetable oils and animal oils, e.g., linseed oil fatty acid, soybean oil fatty acid, tung oil fatty acid, rice bran oil fatty acid, sesame oil fatty acid, cotton seed oil fatty acid, rapeseed oil fatty acid and tall oil fatty acid also can be used. Among them, unsaturated fatty acids in which a viscosity of liquid is low are preferable since they are readily mixed.

As (B) a transition metal salt(s) (hereinafter "(B) transition metal salt"), at least one substance selected from organic acid salts of Co, Mn, Fe and Cu can be used. Examples of (B) transition metal salt include metal salts of stearic acid, dimethyldithio carbamic acid, acetylacetonate, hexoate, oleic acid, linoleic acid, linolenic acid, naphthenic acid and tall oil fatty acid, which act as a catalyst to promote oxygen absorbing reaction of (A) aliphatic compound with unsaturated group. An organic acid salt(s) of metal such as Zn and Pb may be added to them as a promoter.

It is necessary that (A) aliphatic compound and (B) transition metal salt are preliminary mixed to form a liquid. The mixing is performed usually with heating at room temperature (25° C.) or at a temperature of room temperature to about 80° C. It is preferable to dissolve (B) transition metal salt in (A) aliphatic compound with unsaturated group since the oxygen absorbing performance of the composition is improved. The mixing proportion of (B) transition metal salt to (A) aliphatic compound with unsaturated group is 0.005 to 5 parts by weight and preferably 0.05 to 0.5 parts by weight of (B) transition metal salt per 100 parts by weight of (A) aliphatic compound with unsaturated group.

Further, the mixing proportion of solid compound of (C) to mixed liquid of (A) and (B) is 200 to 2000 parts by weight and preferably 500 to 1000 parts by weight of solid compound of (C) per 100 parts by weight of mixed liquid of (A) and (B), When an oxygen absorbing substance to be used as an oxygen absorbent is a liquid, it is usually impregnated (supported) in a solid carrier in order to improve its oxygen absorbing velocity and to facilitate its handling. As conventional carriers to be used in an oxygen absorbent, in order to impregnate (support) a liquid of amount as large as possible in a carrier of a small volume and to make contact area with air wide, porous carriers, e.g., zeolite, activated carbon, paper, non-woven fabric, porous film, pearlite, activated clay sepiolite and clay minerals such as diatomaceous earth have been used.

Further, Japanese Patent Kokai (Laid-open) No. 56-155641 discloses an oxygen absorbent composition requiring no water for absorption of oxygen in which an unsaturated fatty acid compound(s) of oxygen absorbent is supported on a porous carrier such as zeolite.

The present invention is an oxygen absorbent composition mixed the mixed liquid of (A) and (B) and the solid compound of (C) without using above-mentioned conventional porous substances. The amount of the solid compound (C) able to form a mixture with the mixed liquid of (A) and (B) is smaller than an amount able to support the mixed liquid of (A) and (B) on a porous carrier since the solid compound of (C) is not a porous solid. Regarding the mixture of the mixed liquid of (A) and (B) with the solid compound of (C), it is observed that the solid compound of (C) is apparently coated with the mixed liquid of (A) and (B). However, the oxygen absorbing velocity per unit weight of the mixed liquid of (A) and (B) in case of mixing the mixed liquid of (A) and (B) with the solid compound of (C) is remarkably larger than that in case of supporting it on above-mentioned porous carrier or in case of supporting it on a drying agent such as magnesium oxide, potassium carbonate, soda lime and magnesium perchlorate absorbing water vapor by other chemical reaction.

As one of reasons for above-mentioned phenomenon, the following is considered. The oxygen absorbing reaction of (A) aliphatic compound with unsaturated group is hindered in a high humidity such as 100% RH since (A) aliphatic compound with unsaturated group is a hydrophobic substance. Water is generated with progression of a chemical reaction of (A) aliphatic compound with unsaturated group and oxygen. It is considered that generated water hinders the oxygen absorbing reaction. In the present invention, (A) aliphatic compound with unsaturated group contacts the solid compound of (C) as a carrier in a solid-liquid phase. Therefore, it is considered that generated water is properly removed by a chemical reaction with the solid compound of (C) to depress lowering of the oxygen absorbing velocity, so that the oxygen absorbing velocity becomes larger than that in case of supporting it on above-mentioned porous carrier.

The composition of the present invention is enclosed in a gas-permeable packing material formed of a base sheet such as paper, non-woven fabric and plastic and then hermetically sealed in a container with a barrier property against oxygen and water vapor together with an object to be preserved to use. The composition can be used property in a form of powder, granule, tablet and sheet.

PREFERRED EMBODIMENT OF THE INVENTION

The present invention will be described in more detail below, referring to Examples, which are not intended to limit the scope of the present invention.

EXAMPLE 1

3.80 g of liquid butadiene oligomer obtained on the market, manufactured by Nihon Sekiyu Kagaku k.k., in Japan and 0.10 g of manganese naphthenate (manganese concentration 10%) obtained on the market, manufactured by Wako Junyaku Kogyo k.k., in Japan at 50° C. for 5 minutes in the atmosphere of nitrogen, thereby obtaining a liquid mixed (A) aliphatic compound with unsaturated group and (B) transition metal salt. 1.95 g of the liquid thus obtained was added in a dropping wise to 15.00 g of calcium oxide with particle diameters of 0.50 to 0.85 mm and a purity of 97.5% and then mixed, whereby the oxygen absorbent composition of the present invention was obtained. A small bag enclosed 3.39 g of the composition thus obtained in a medical wrapping paper obtained on the market, manufactured by Tokyo Nihon Yushi k.k., in Japan was put in an aluminium foil-laminated plastic bag (hereinafter, "aluminium bag") together with 300 ml (relative humidity 70% RH, 25° C.) of air and preserved at 25° C. After two days from starting of the preservation, the oxygen concentration and the relative humidity in the aluminum bag were analyzed by a gas chromatography method. The results were shown in Table 1. The oxygen concentration in the aluminum bag was decreased to 0.1% or less after two days and the relative humidity was 1% RH.

EXAMPLE 2 to 8

The compositions were prepared in the same manner as in Example 1 except that liquid butadiene oligomer and manganese naphthenate were changed to each substance and proportion shown in Table 1. The evaluation results were shown in Table 1. As shown in Examples 4 and 6, when magnesium chloride is used. magnesium oxide can be mixed in order to prevent formation of a liquid due to deliquescence after absorption of moisture. In all of Examples 2 to 8, the oxygen concentration in the aluminium bag was decreased to 0.1% or less after two days and the relative humidity was 1% RH.

Each substance used in Examples 2 to 8 was as follow

| | |
|---|---|
| isoprene oligomer | obtained on the market, manufactured by JSR k.k., in Japan |
| tall oil fatty acid | obtained on the market, manufactured by Arakawa Kagaku Kogyo k.k., in Japan |
| linoleic acid and linolenic acid | obtained on the market, manufactured by Wako Junyaku Kogyo k.k., in Japan |
| linseed oil soybean oil and tall oil | obtained on the market, manufactured by Komune Kagaku Yakuhin k.k., in Japan |
| cobalt naphthenate iron naphthenate, copper naphthenate, zinc naphthenate, and lead naphthenate | obtained on the market, manufactured by Wako Junyaku Kogyo k.k., in Japan |
| cobalt tall oil acid and manganese hexoate | obtained on the market, manufactured by Toei Kako k.k., in Japan |
| magnesium chloride | particle diameter 0.50 to 0.85 mm purity 95% or above |
| calcium chloride | particle diameter 0.50 to 0.85 mm purity 95% or above |
| magnesium oxide | obtained on the market, manufactured by Wako Junyaku Kogyo k.k., in Japan |

EXAMPLE 9

The composition was prepared in the same as in Example 1 except that calcium oxide exposed in the atmosphere at 25° C. and 50% RH for 5 hours was used instead of calcium oxide in Example 1. The evaluation result was shown in Table 2.

Water content of zeolite, etc., was calculated from the following formula.

Water content (wt %)=$(B-A)/A \times 100$

A: weight of zeolite, etc., dried at 170° C. for 2 hours. This water content is assumed as 0 wt %.
B: zeolite, etc., dried at 170° C. for 2 hours is exposed in the atmosphere at 25° C. and 50% RH for 5 hours and weight of zeolite after completion of the exposure is indicated.

Comparative Examples 1 to 2

The compositions were prepared in the same manner as in Example 1 except that two zeolites (clinoptilolite obtained on the market, manufactured by Nihon Katsei Hakudo k.k., in Japan) before and after exposure in the atmosphere at 25° C. and 50% RH for 5 hours were used and substances in Table 2 were used in the proportion (weight) shown in Table 2. The evaluation results were shown in Table 2.

As shown in Comparative Examples 1 to 2, the zeolite exposed in the atmosphere at 25° C. and 50% RH for 5 hours absorbed 7 wt % of water vapor. When the mixed liquid of (A) and (B) was supported on the zeolite, oxygen absorbing velocity was lowered to a large degree. However, as shown in Examples 1 and 9, when calcium oxide was used, only 0.6 wt % of water vapor was absorbed. When the mixed liquid of (A) and (B) was mixed with calcium oxide, oxygen absorbing velocity was the same as in case prior to absorption of water vapor. As described above, it is clear that oxygen absorbing velocity of the oxygen absorbent composition of the present invention is large and stabilized also after exposure in the atmosphere, so that handling in its production is easy.

Comparative Examples 3 to 10

The compositions were prepared in the same manner as in Example 1 except that substances shown in Table 3 were used in the proportion (weight) shown in Table 3. The evaluation results were shown in Table 3. In Comparative Examples 3 to 6, conventional porous substances including substances described in Japanese Patent Kokai (Laid-open) No. 56-155641 were used. In Comparative Examples 7 to 10, drying agents except calcium oxide to absorb water vapor due to chemical reaction were used. In all cases, the oxygen concentration in an aluminium bag was several % even after 7 days and did not reach to 0.1% or below differently from cases in Examples. Further, in silica gel, aluminium oxide and soda lime, the amount able to support the mixed liquid of (A) and (B) was small and the volume of the composition became large. Also in the regard, there was practical problems.

Each substance used in Comparative Examples 3 to 10 was as follows.

| | |
|---|---|
| silica gel and aluminum oxide | obtained on the market, manufactured by Kanto Kagaku k.k., in Japan. |
| activated carbon | obtained on the market, manufactured by Kurare Chemical k.k., in Japan. |
| sepiolite | obtained on the market, manufactured by Nitetsu Kogyo k.k., in Japan. |
| potassium carbonate anhydride magnesium perchlorate, soda lime and magnesium oxide | obtained on the market, manufactured by Asahi Kagaku Kogyo k.k., in Japan. obtained on the market, manufactured by Wako Junyaku Kogyo k.k., in Japan |

In the present invention, an oxygen absorbent composition with a function of water vapor absorption and stabilized oxygen absorbing velocity is provided. Although calcium oxide, etc., to absorb moisture due to chemical reaction as a drying agent can be obtained on the market, the present invention is an oxygen absorbent composition in which calcium oxide, etc., is provided with oxygen absorbing potency without increasing its volume. The oxygen absorbent composition of the present invention alone can maintain the interior of a hermetically sealed container to a dried and oxygen-free state without using together a drying agent, differently from conventional compositions.

wherein a content of said (C) at least one solid compound selected from the group consisting of calcium oxide, calcium chloride and magnesium chloride is 500 to 1000 parts by weight per 100 parts by weight of said liquid mixture of

TABLE 1

| | (A) Aliphatic compound with unsaturated group | (B) Transition metal salt | Carrier | Oxygen cocentration after 2 days | Humidity after 2 days |
|---|---|---|---|---|---|
| Example 1 | butadiene oligomer: 0.38 g | Mn naphthenate (10%): 0.010 g | CaO: 3.0 g | 0.1% | 1% RH |
| Example 2 | isoprene oligomer: 0.38 g | Co naphthenate (6%): 0.010 g | $MgCl_2$: 3.0 g | 0.1% | 1% RH |
| Example 3 | tall oil fatty acid: 0.43 g | Fe naphthenate (5%): 0.010 g | $CaCl_2$: 3.0 g | 0.1% | 1% RH |
| Example 4 | linoleic acid: 0.43 g | Cu naphthenate (10%): 0.010 g | $MgCl_2$: 3.0 g MgO: 0.5 g | 0.1% | 1% RH |
| Example 5 | linolenic acid: 0.43 g | Mn naphthenate (10%): 0.01 g Zn naphthenate (8%): 0.005 g | CaO: 2.5 g $CaCl_2$: 0.5 g | 0.1% | 1% RH |
| Example 6 | linseed oil: 0.43 g | Mn naphthenate (10%): 0.01 g Pb naphthenate (15%): 0.003 g | CaO: 1.5 g $MgCl_2$: 1.3 g MgO: 0.2 g | 0.1% | 1% RH |
| Example 7 | soybean oil: 0.43 g | Co tall oil (8%): 0.01 g | CaO: 3.0 g | 0.1% | 1% RH |
| Example 8 | tall oil: 0.43 g | Mn hexoate (6%): 0.01 g | CaO: 3.0 g | 0.1% | 1% RH |

Oxygen concentration in the atmosphere: 21.0%

TABLE 2

| | (A) Aliphatic compound with unsaturated group | (B) Transition metal salt | Carrier | Oxygen concentration after 7 hours | after 1 days | after 2 days | Humidity after 2 days |
|---|---|---|---|---|---|---|---|
| Comp. Ex. 1 | same as in Example 1 | same as in Example 1 | zeolite: 3.0 g water content: 0 wt % before exposure | 15.5% | 6.5% | 1.5% | 1% RH |
| Comp. Ex. 2 | same as in Example 1 | same as in Example 1 | zeolite: 3.2 g water content: 7 wt % after exposure | 21.0% | 10.5% | 3.5% | 1% RH |
| Example 1 | butadiene oligomer: 0.38 g | Mn naphthenate (10%): 0.010 g | CaO: 3.0 g water content: 0 wt % before exposure | 6.5% | 0.2% | 0.1% | 1% RH |
| Example 9 | same as in Example 1 | same as in Example 1 | CaO: 3.0 g water content: 0.6 wt % after exposure | 6.5% | 0.2% | 0.1% | 1% RH |

Oxygen concentration in the atmosphere: 21.0%

TABLE 3

| | (A) Aliphatic compound with unsaturated group | (B) Transition metal salt | Carrier | Oxygen concentration after 2 days | after 7 days | Humidity after 2 days |
|---|---|---|---|---|---|---|
| Comp. Ex. 3 | ✕ [1] | ✕ [1] | silica gel: 20.0 g | 21.0% | 18.5% | 1% RH |
| Comp. Ex. 4 | ✕ [1] | ✕ [1] | aluminum oxide: 10.0 g | 21.0% | 19.5% | 1% RH |
| Comp. Ex. 5 | ✕ [1] | ✕ [1] | activated carbon: 3.0 g | 19.5% | 18.0% | 40% RH |
| Comp. Ex. 6 | ✕ [1] | ✕ [1] | sepiolite: 3.0 g | 2.5% | 1.5% | 40% RH |
| Comp. Ex. 7 | ✕ [1] | ✕ [1] | $K_2CO_3$ anhydride: 5.0 g | 14.5% | 12.9% | 1% RH |
| Comp. Ex. 8 | ✕ [1] | ✕ [1] | $Mg(ClO_4)_2$: 6.0 g | 10.0% | 5.6% | 1% RH |
| Comp. Ex. 9 | ✕ [1] | ✕ [1] | soda lime: 12.0 g | 20.5% | 19.5% | 1% RH |
| Comp. Ex. 10 | ✕ [1] | ✕ [1] | MgO: 3.0 g | 12.0% | 2.5% | 2% RH |

Note
✕ [1]: same as in Example 1
Oxygen concentration in the atmosphere: 21.0%

What is claimed is:
1. An oxygen absorbent composition absorbing water vapor, consisting of a blend of a liquid mixture of (A) an aliphatic compound(s) with an unsaturated group(s) and (B) a transition metal salt(s) with (C) at least one solid compound selected from the group consisting of calcium oxide, calcium chloride and magnesium chloride as a carrier, (A) an aliphatic compound(s) with an unsaturated group(s) and (B) a transition metal salt(s).

2. The oxygen absorbent composition according to claim 1, wherein said (A) an aliphatic compound(s) with an unsaturated group(s) is (are) at least one substance selected from the group consisting of aliphatic hydrocarbons with an unsaturated group(s), unsaturated fatty acids and fats and oils containing an unsaturated fatty acid(s).

3. The oxygen absorbent composition according to claim 1, wherein said (B) a transition metal(s) is(are) at least one salt of metal selected from the group consisting of Co, Mn, Fe and Cu.

4. The oxygen absorbent composition according to claim 1, wherein a content of said (B) a transition metal salt(s) is (are) 0.005 to 5 parts by weight per 100 parts by weight of (A) aliphatic compound with an unsaturated group(s).

* * * * *